United States Patent
Shon et al.

(10) Patent No.: US 12,034,775 B2
(45) Date of Patent: Jul. 9, 2024

(54) METHOD AND APPARATUS FOR DIGITAL FORENSIC CORRESPONDING TO INTERNET OF THINGS

(71) Applicant: AJOU UNIVERSITY INDUSTRY-ACADEMIC COOPERATION FOUNDATION, Suwon-si (KR)

(72) Inventors: Tae Shik Shon, Suwon-si (KR); Yeong Hun Shin, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 275 days.

(21) Appl. No.: 17/578,815

(22) Filed: Jan. 19, 2022

(65) Prior Publication Data

US 2022/0239703 A1 Jul. 28, 2022

(30) Foreign Application Priority Data

Jan. 22, 2021 (KR) .................. 10-2021-0009155

(51) Int. Cl.
*H04L 9/40* (2022.01)
*G16Y 30/10* (2020.01)
*H04L 9/32* (2006.01)

(52) U.S. Cl.
CPC ............ *H04L 63/306* (2013.01); *G16Y 30/10* (2020.01); *H04L 9/3263* (2013.01)

(58) Field of Classification Search
CPC ............... H04L 63/306; H04L 63/0823; H04L 63/1433; H04L 9/3263; H04L 9/3213;
(Continued)

(56) References Cited

U.S. PATENT DOCUMENTS

| 2018/0040114 A1* | 2/2018 | Stroupe | G06F 21/10 |
| 2021/0351930 A1* | 11/2021 | Gargaro | H04L 9/3213 |
| 2022/0116231 A1* | 4/2022 | Choi | B60L 53/30 |

FOREIGN PATENT DOCUMENTS

| KR | 10-2011-0020051 A | 3/2011 | |
| KR | 102156174 B1 * | 9/2020 | G06F 16/951 |
| WO | WO-2016101005 A1 * | 6/2016 | G06Q 50/18 |

OTHER PUBLICATIONS

Yeonghun Shin et al., "Certificate Injection-based Encrypted Traffic Forensics in AI Speaker Ecosystem", Jul. 23, 2020, pp. 1-21.

(Continued)

*Primary Examiner* — Alina A Boutah
(74) *Attorney, Agent, or Firm* — Sughrue Mion, PLLC

(57) ABSTRACT

The present application relates to a method and apparatus for digital forensic corresponding to an IoT (Internet of Things) terminal, the method including: performing, by an electronic device, an analysis of an Internet of Things (IoT) terminal to which digital forensics is to be performed; selecting an injection method of injecting, by the electronic device, a certificate into the IoT terminal; injecting, by the electronic device, a certificate into at least one of the IoT terminal, the electronic device, and a portable device communicating with the IoT terminal using the selected injection method; and verifying, by the electronic device, data stored in a cloud server communicating with the IoT terminal based on the injected certificate, and can also be applied to other embodiment.

7 Claims, 4 Drawing Sheets

(58) Field of Classification Search
CPC ..... H04L 9/3268; H04L 43/065; H04L 67/59; G16Y 30/10; G16Y 40/20; G16Y 40/35; G06F 9/45558; G06F 9/45508; G06F 21/30; G06F 2009/45566; G06F 2009/45579; G06F 2009/45587; G06F 2009/45595

See application file for complete search history.

(56) References Cited

OTHER PUBLICATIONS

Jo et al., "Digital Forensic Practices and Methodologies for AI Speaker Ecosystems", Digital Investigation, 2019, vol. 29, pp. S80-S83 (14 pages total).

* cited by examiner

| IoT terminal | Injection method | Cloud artifacts |
|---|---|---|
| AI speaker from Company A | case 5 | Authentication token<br>Device Info<br>Location Info<br>Usage Timestamp |
| AI speaker from Company B | case 3,5 | Session token<br>User Info<br>Device Info<br>Memo Info<br>Alarm Info<br>Schedule Info<br>Location Info<br>Third-party app Info<br>Voice command<br>Usage Timestamp |

FIG. 4

METHOD AND APPARATUS FOR DIGITAL FORENSIC CORRESPONDING TO INTERNET OF THINGS

CROSS-REFERENCE TO RELATED APPLICATION

This application claims priority to and the benefit of Korean Patent Application No. 10-2021-0009155, filed on Jan. 22, 2021, the disclosure of which is incorporated herein by reference in its entirety.

TECHNICAL FIELD

The present invention relates to a method and apparatus for digital forensic corresponding to an IoT (Internet of Things) terminal.

BACKGROUND

The IoT (Internet of Things) refers to a service that can communicate information by connecting all things based on the Internet. There is a trend that various types of terminals capable of Internet of Things (hereinafter referred to as IoT terminals) to increase user convenience and improve quality of life are being actively developed. These IoT terminals are used to build a user-friendly system by grafting cloud computing technology. In addition, a user's personal information and usage history information according to the use of a service using the IoT terminal are stored in a cloud server that communicates with the IoT terminal.

For this reason, IoT terminals tend to have various issues as digital evidence in the field of digital forensics to find criminal clues and the like. However, since most commercial technologies serviced mainly by IoT terminals have a network centered on the cloud, the physical/logical location of digital evidence is unclear, making it difficult to easily determine whether evidence exists or whether evidence can be collected. In addition, additional costs may be incurred when a company that provides services using IoT terminals is requested to cooperate in collecting evidence, and it is difficult to secure active cooperation from related organizations and complete trust in the results of the collection. Accordingly, there is a need for a method capable of more easily performing digital forensics corresponding to IoT terminals.

The technology underlying the present invention is disclosed in Korean Patent Application Laid-Open Publication No. 10-2011-0020051.

The above information disclosed in this Background section is only for enhancement of understanding of the background of the invention and it may therefore contain information that does not form the prior art that is already known to a person of ordinary skill in the art.

SUMMARY

Technical Problem

Various aspects of the present invention is directed to providing a method and apparatus for digital forensics on an IoT terminal capable of directly collecting information stored in a cloud server that communicates with the IoT terminal.

Technical Solution

A method for digital forensics according to an embodiment of the present invention includes performing, by an electronic device, an analysis of an Internet of Things (IoT) terminal to which digital forensics is to be performed; selecting an injection method of injecting, by the electronic device, a certificate into the IoT terminal; injecting, by the electronic device, a certificate into at least one of the IoT terminal, the electronic device, and a portable device communicating with the IoT terminal using the selected injection method; and verifying, by the electronic device, data stored in a cloud server communicating with the IoT terminal based on the injected certificate.

In addition, in an embodiment, the performing the analysis of the IoT terminal is a step of verifying type, operating system, support function, vulnerability and backdoor, printed circuit board (PCB) and chip-off availability of the IoT terminal.

In addition, in an embodiment, the selecting the injection method is a step of selecting a method of injecting an image of the IoT terminal into a portable device so that the portable device using the same operating system as the IoT terminal performs the same function as the IoT terminal.

In addition, in an embodiment, the selecting the injection method is a step of selecting a method of emulating, by the electronic device, the IoT terminal in an emulator installed in the electronic device.

In addition, in an embodiment, the selecting the injection method is a step of selecting a method of obtaining, by the electronic device, administrator authority for the IoT terminal by verifying a vulnerability and a backdoor of the IoT terminal.

In addition, in an embodiment, the selecting the injection method is a step of selecting a method of connecting, by the electronic device, with the IoT terminal through an external port provided in the IoT terminal.

In addition, in an embodiment, the selecting the injection method is a step of selecting a method of performing, by the electronic device, a chip-off of the IoT terminal and injecting the chip which is off into the electronic device.

In addition, in an embodiment, the method further comprises, after injecting the certificate into the IoT terminal, setting, by the electronic device, a communication network and a proxy with the cloud server.

In addition, in an embodiment, the method further comprises, after setting the communication network and the proxy, collecting, by the electronic device, network packets related to communication between the IoT terminal and the cloud server; and verifying, by the electronic device, access token information, types of personal information, and domain information of the cloud server included in the network packets by analyzing the network packets.

In addition, in an embodiment, the verifying the data stored in the cloud server communicating with the IoT terminal comprises performing, by the electronic device, a replay attack based on the access token.

In addition, an apparatus for digital forensics according to an embodiment of the present invention comprises a controller configured to: select an injection method of injecting a certificate into an Internet of Things (IoT) terminal through analysis of the IoT terminal to which digital forensics is to be performed, and verify data stored in a cloud server communicating with the IoT terminal by injecting a certificate into at least one of the IoT terminal, the apparatus for digital forensics, and a portable device communicating with the IoT terminal using the selected injection method; and a display for displaying the verified data.

In addition, in an embodiment, the controller performs the analysis of the IoT terminal by verifying type, operating system, support function, vulnerability and backdoor, PCB and chip-off availability of the IoT terminal.

In addition, in an embodiment, the controller selects as the injection method any one from among: a method of injecting an image of the IoT terminal into a portable device so that the portable device using the same operating system as the IoT terminal performs the same function as the IoT terminal; a method of emulating the IoT terminal in a pre-installed emulator; a method of obtaining administrator authority for the IoT terminal based on the vulnerability and backdoor of the IoT terminal; a method of connecting with the IoT terminal through an external port provided in the IoT terminal; and a method of injecting an chip which is off in the IoT terminal.

In addition, in an embodiment, the controller sets a communication network and a proxy with the cloud server to collect network packets related to communication between the IoT terminal and the cloud server, and verifies access token information, types of personal information, and domain information of the cloud server included in the network packets by analyzing the network packets.

In addition, in an embodiment, the controller performs a replay attack based on the access token.

Advantageous Effects

As described above, the method and apparatus for digital forensics on an IoT terminal according to the present invention can directly collect information stored in a cloud server that communicates with the IoT terminal, thereby more easily performing digital forensics on the IoT terminal and accurately verifying whether the IoT terminal complies with laws and regulations related to the protection of personal information.

BRIEF DESCRIPTION OF THE DRAWINGS

The above and other aspects, features, and advantages of the present invention will become more apparent to those of ordinary skill in the art by describing embodiments thereof in detail with reference to the accompanying drawings, in which:

FIG. 4 is a diagram illustrating a method for injecting a certificate according to an IoT terminal according to an exemplary embodiment of the present invention and artifacts collected through the method.

DETAILED DESCRIPTION OF THE EMBODIMENTS

Figure 1:
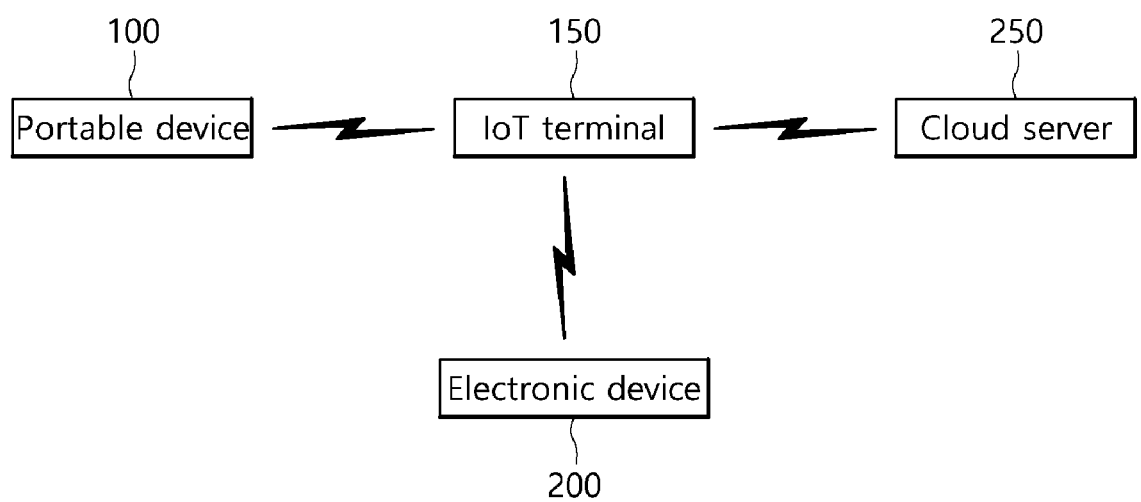
FIG. 1 is a block diagram illustrating a system for performing digital forensics according to an exemplary embodiment of the present invention.

Hereinafter, preferred embodiments according to the present invention will be described in detail with reference to the accompanying drawings. The detailed description to be disclosed hereinafter with the accompanying drawings is intended to describe exemplary embodiments of the present invention and is not intended to represent the only embodiments in which the present invention may be implemented. In the drawings, parts unrelated to the description may be omitted for clarity of description of the present invention, and like reference numerals may designate like elements throughout the specification.

In an embodiment of the present invention, expressions such as "or" and "at least one" may represent one of the words listed together or a combination of two or more. For example, "A or B" and "at least one of A and B" may include only one of A or B, or may also include both A and B.

FIG. 1 is a block diagram illustrating a system for performing digital forensics according to an exemplary embodiment of the present invention.

Referring to FIG. 1, a system 10 according to the present invention includes a portable device 100, an IoT terminal 150, an electronic device 200, and a cloud server 250.

The portable device 100 is a device such as a smartphone, a smart pad, or a tablet PC (personal computer), and may be a device operating with a mobile operating system such as an Android mobile operating system.

The IoT terminal 150 is a terminal that performs an operation according to a user's request in a cloud-based system 10, and in an embodiment of the present invention, an artificial intelligent (AI) speaker will be described as an example. However, the IoT terminal 150 is not limited to the AI speaker and may be replaced by various types of IoT terminals such as a smart television, a music player, and the like.

When the IoT terminal 150 such as AI speaker communicates with the cloud server 250, it performs communication using traffic encrypted with TLS (transport layer security). MitM (man in the middle) analysis is required to analyze such encrypted traffic. In particular, since a hypertext transfer protocol (HTTP) proxy tool is used to analyze TLS-based encrypted traffic using MitM, in order to decrypt the encrypted traffic based on a certificate, it is necessary to install the certificate of the HTTP proxy tool in the target device, for example, the IoT terminal 150 and the cloud server 250. The HTTP proxy tool installed in the IoT terminal 150 and the cloud server 250 is used to analyze encrypted traffic between the IoT terminal 150 and the cloud server 250.

To this end, the electronic device 200 injects a certificate into the IoT terminal 150 to perform digital forensics on data stored in the cloud server 250. More specifically, the electronic device 200 may identify the portable device 100 and the IoT terminal 150 associated with the cloud-based system 10. The electronic device 200 may verify whether the IoT terminal 150 constituting the cloud-based system 10 is online, and verify type, operating system, support function, vulnerability and backdoor, printed circuit board (PCB) and chip-off availability, and the like of the IoT terminal 150.

The electronic device 200 performs digital forensics by injecting a certificate into at least one of the IoT terminal 150, the electronic device 200, and the portable device 100 that communicates with the IoT terminal 150 and by verifying data stored in the cloud server 250 through a communication network between the IoT terminal 150 and the cloud server 250. In this case, the data stored in the cloud server 250 may be data such as user information and usage history using the IoT terminal 150. A more detailed operation of the electronic device 200 will be described with reference to FIG. 2 below.

The cloud server 250 refers to a server that provides a cloud service to the IoT terminal 150 through an access point (AP). The cloud server 250 receives and stores data such as user information and usage history from the IoT terminal 150 through a communication network with the IoT terminal 150.

Figure 2:
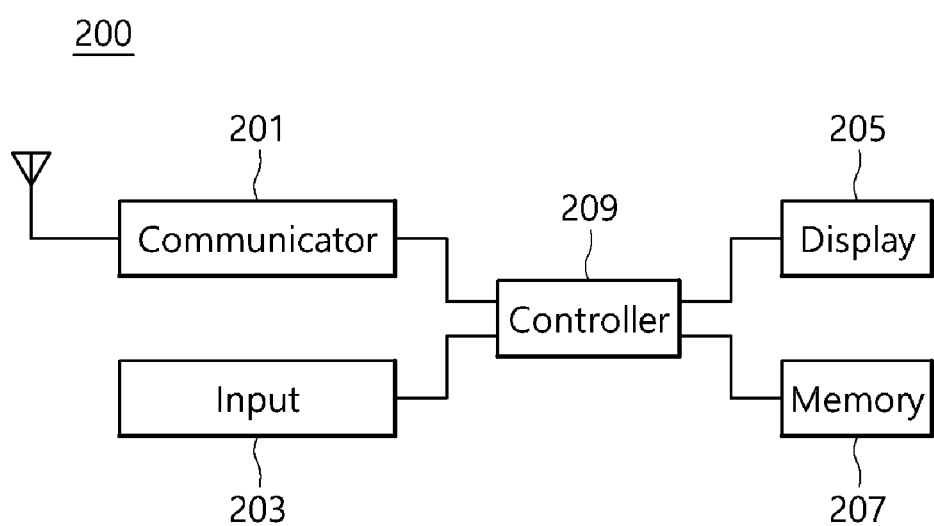
FIG. 2 is a block diagram illustrating an electronic device for performing digital forensics according to an exemplary embodiment of the present invention.

FIG. 2 is a block diagram illustrating an electronic device for performing digital forensics according to an exemplary embodiment of the present invention.

Referring to FIG. 2, the electronic device 200 according to the present invention includes a communicator 201, an input 203, a display 205, a memory 207, and a controller 209.

The communicator 201 performs communication with the cloud server 250. To this end, the communicator 201 may perform wireless communication such as 5$^{th}$ generation communication (5G), long term evolution (LTE), long term evolution-advanced (LTE-A), and wireless fidelity (Wi-Fi), and may perform wired communication using a cable.

The input 203 generates input data in response to an input of a user of the electronic device 200. To this end, the input 203 may include an input device such as a keyboard, a mouse, a keypad, a dome switch, a touch panel, a touch key, and a button.

The display 205 outputs output data according to the operation of the electronic device 200. To this end, the display 205 may include a display device such as a liquid crystal display (LCD), a light emitting diode (LED) display, and an organic light emitting diode (OLED; organic LED) display. In addition, the display 205 may be combined with the input 203 to be implemented in the form of a touch screen.

The memory 207 stores operation programs of the electronic device 200. In particular, the memory 207 stores an algorithm for analyzing the IoT terminal 150, an algorithm for verifying an injection method for injecting a certificate, and the like.

The controller 209 analyzes the IoT terminal 150 for digital forensics of the IoT terminal 150. The controller 209 selects an injection method for injecting a certificate into the IoT terminal 150 according to the analysis result of the IoT terminal 150, and injects the certificate into at least one of the IoT terminal 150, the electronic device 200, and the portable device 100 communicating with the IoT terminal 150 based on the selected injection method. The controller 209 verifies data stored in the cloud server 250 communicating with the IoT terminal 150 based on the injected certificate.

More specifically, when a start signal for performing digital forensics is received through the input 203, the controller 209 analyzes the IoT terminal 150 to which digital forensics is to be performed. In this case, the controller 209 may perform the analysis of the IoT terminal 150 by verifying type, operating system, support function, vulnerability and backdoor, PCB and chip-off availability of the IoT terminal 150.

The controller 209 selects a certificate injection method suitable for the IoT terminal 150 according to the analysis result of the IoT terminal 150, and injects the certificate based on the selected injection method. The controller 209 sets a proxy with the cloud server 250. In this case, there are five injection methods for injecting the certificate into the IoT terminal 150 as below, and the controller 209 selects one of the five methods according to the analysis result of the IoT terminal 150. In addition, the following five methods will be described with an example of a portable device 100 using Android operating system, and an IoT terminal 150, for example, an AI speaker.

The first method is a method of injecting an image of the AI speaker into the portable device 100 so that the portable device 100 performs the same function as the AI speaker. The second method is a method in which the controller 209 emulates the IoT terminal 150 in an emulator installed in the electronic device 200. The third method is a method in which the controller 209 obtains administrator authority for the IoT terminal 150 when a vulnerability and a backdoor of the IoT terminal 150 are verified. The fourth method is a method of connecting the IoT terminal 150 and the electronic device 200 through an external port provided in the IoT terminal 150. The fifth method is a method of performing chip-off for the IoT terminal 150 and injecting the chip which is off into the electronic device 200.

When the certificate injection and proxy setting are completed, the controller 209 collects network packets for a communication section between the AI speaker, that is, the IoT terminal 150 and the cloud server 250. When an image for the AI speaker is injected into the portable device 100, the controller 209 may collect network packets for a communication section between the AI speaker and the cloud server 250 through the portable device 100. Although not shown, for this purpose, the controller 209 may communicate with the portable device 100 through the communicator 201.

The controller 209 verifies data including access token information, types of personal information, and domain information of the cloud server 250 included in the network packets by analyzing the collected network packets. The controller 209 performs a replay attack based on the access token. Through this, the controller 209 performs digital forensics of the IoT terminal 150 by reproducing the communication method between the IoT terminal 150 and the cloud server 250 and by verifying the information stored in the cloud server 250 through communication with the cloud server 250.

Figure 3:
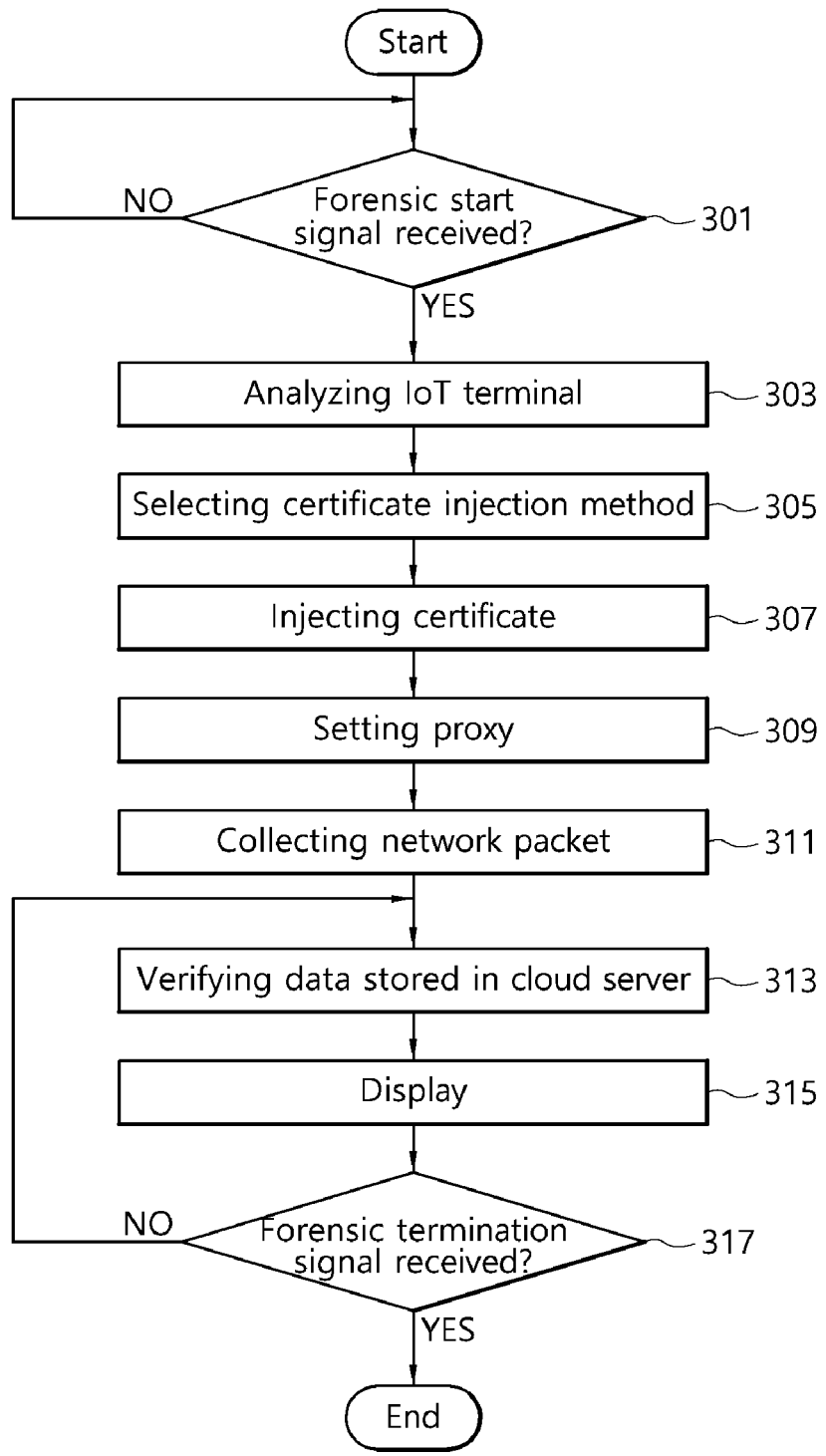
FIG. 3 is a flowchart illustrating a method for performing digital forensics according to an exemplary embodiment of the present invention.

FIG. 3 is a flowchart illustrating a method for performing digital forensics according to an exemplary embodiment of the present invention.

Referring to FIG. 3, at step 301, the controller 209 checks whether a start signal for performing digital forensics is received through the input 203. As a result of the check at step 301, if the start signal is received, the controller 209 performs step 303, and if the start signal is not received, the controller 209 waits for the reception of the start signal.

At step 303, the controller 209 analyzes the IoT terminal 150 to which digital forensics is to be performed. More specifically, the controller 209 may perform the analysis of the IoT terminal 150 by verifying type, operating system, support function, vulnerability and backdoor, PCB and chip-off availability of the IoT terminal 150.

At step 305, the controller 209 selects a certificate injection method suitable for the IoT terminal 150 according to the analysis result of the IoT terminal 150. At step 307, the controller 209 injects a certificate based on the injection method selected at step 305 and performs step 309. At step 309, the controller 209 sets a proxy with the cloud server 250 and performs step 311. There are five injection methods for injecting the certificate into the IoT terminal 150 as below, and the controller 209 selects one of the five methods according to the analysis result of the IoT terminal 150. In addition, the following five methods will be described with an example of a portable device 100 using Android operating system, and an IoT terminal 150, for example, an AI speaker.

The first method is a method of injecting an image of the AI speaker into the portable device 100 so that the portable device 100 performs the same function as the AI speaker.

More specifically, the first method is a method of porting the NAND-flash obtained from the AI speaker to the portable device 100 to make the portable device 100 a new device that performs the same function as the AI speaker, that is, a method of injecting a certificate into the portable device 100 and set a proxy to run MitM using the generated device. To this end, a user of the electronic device 200 ports an image of the AI speaker to the portable device 100 and installs an application for the AI speaker. And the user modifies the image of the AI speaker to adapt to the environment of the portable device 100.

The user installs the Android version 7.1.2 Android open source project ROM in the portable device 100 in order for the portable device 100 to perform the same function as the AI speaker. Then, the user selects essential data necessary for the AI speaker to operate, modifies it to adapt to the environment of the portable device 100, and ports it. Through this, the user may perform digital forensics on the AI speaker through the portable device 100 by allowing the portable device 100 to perform the same function as the AI speaker.

The second method is a method in which the controller 209 emulates the IoT terminal 150 in an emulator installed in the electronic device 200.

More specifically, as in the first method, the second method is a method of solving the difficulty of porting hardware devices, that is, NAND-flash porting of AI speakers, that is, a method of emulating the image for the AI speaker in the emulator using an emulator such as QEMU.

The user of the electronic device 200 obtains the firmware of the AI speaker through chip-off, and extracts the Ramdisk image using kernel extraction and decompression. The user may perform digital forensics on the AI speaker through an emulator by processing the extracted kernel and Ramdisk images in a way necessary for booting the emulator.

The third method is a method in which the controller 209 obtains administrator authority for the IoT terminal 150 when a vulnerability and a backdoor of the IoT terminal 150 are verified.

More specifically, the third method is a method of injecting a certificate by utilizing the backdoor and vulnerabilities that exist in the AI speaker. To this end, the user of the electronic device 200 may perform static analysis on the AI speaker through chip-off of the AI speaker, or may use known vulnerabilities and backdoors of the AI speaker.

The user can verify various backdoors and vulnerabilities, such as verifying that the AI speaker has a vulnerability in the backdoor for debugging or that it is possible to obtain root privileges by exploiting the vulnerability of the process running in the AI speaker. In this way, when the backdoor and vulnerability are verified and the AI speaker supports an external display, the user may connect the AI speaker and the electronic device 200 through the HDMI (high definition multimedia interface) port and, by using the mobile hotspot function, build a Wi-Fi (wireless fidelity) network environment to which AI speakers can be connected. In addition, although the connection between the AI speaker and the electronic device 200 is described as an example in the embodiment of the present invention, the AI speaker may be connected to a separate display device (not shown).

The user may utilize the vulnerability to install a certificate on the AI speaker, and may obtain administrator authority for the AI speaker by installing the certificate through the shell. In this way, after installing the certificate on the AI speaker, the user may collect the TLS traffic between the AI speaker and the cloud server 250 using Telerik Fiddler, an HTTP proxy tool installed in the electronic device 200, thereby collecting and analyzing encrypted traffic. Through this, digital forensics can be performed on the AI speaker.

The fourth method is a method of connecting the IoT terminal 150 and the electronic device 200 through an external port provided in the IoT terminal 150.

More specifically, the fourth method is used when the backdoor and vulnerability of the AI speaker are not verified unlike the third method, and is a method of connecting the electronic device 200 and the AI speaker to a TTY (e.g., terminal emulator) through a debugging port such as a universal asynchronous receiver/transmitter (UART) provided in the AI speaker, and extracting, modifying, and rewriting data from NAND-flash through the U-Boot command.

The electronic device 200 and the AI speaker may be contact-connected using a pogo pin, and a contact point may be directly connected through soldering. In this case, the contact point be UART_TX, UART_RX, or GND (ground). In this way, after connecting the contact point, the electronic device 200 accesses the NAND-flash of the AI speaker to extract data. Next, the user may modify the data extracted from the NAND-flash and inject the certificate into the NAND-flash. In this case, since a terminal application program is required to read and write data, the electronic device 200 may use PuTTY, which is a client program that can be accessed remotely from windows. Through this, the electronic device 200 may perform digital forensics on the AI speaker.

The fifth method is a method of performing chip-off for the IoT terminal 150 and injecting the chip which is off into the electronic device 200.

More specifically, the fifth method is used when it is impossible to inject the certificate into the AI speaker with the first to fourth methods, and is a method of disassembling the AI speaker, separating the NAND-flash from the main board, and mounting the NAND-flash in the electronic device 200. Through this, the electronic device 200 may perform digital forensics on the AI speaker.

Next, at step 311, the controller 209 collects network packets for a communication section between the AI speaker, that is, the IoT terminal 150 and the cloud server 250, and performs step 313. At step 313, the controller 209 verifies data including access token information, types of personal information, and domain information of the cloud server 250 included in the network packets by analyzing the collected network packets. The controller 209 performs a replay attack based on the verified access token.

At step 315, the controller 209 verifies information stored in the cloud server 250 through the replay attack, and displays the verified data on the display 205. Next, at step 317, when a termination signal for terminating digital forensics for the IoT terminal 150 is received through the input 203, the controller 209 may terminate the corresponding process, and if the termination signal is not received, may return to step 313 and re-perform the above step.

FIG. 4 is a diagram illustrating a method for injecting a certificate according to an IoT terminal according to an exemplary embodiment of the present invention and artifacts collected through the method. In this case, FIG. 4 shows the test results of performing digital forensics after injecting the certificate into the AI speaker through five certificate injection methods. In addition, the names of companies and AI speakers corresponding to the IoT terminal 150 are shown as private.

Referring to FIG. 4, the AI speaker of Company A shows the digital forensic result performed after injecting the certificate through the fifth method. The electronic device 200 may verify information related to the Authentication token, Device Info, Location Info, and Usage Timestamp stored in the cloud server 250 by the AI speaker of Company A through communication with the cloud server 250.

In addition, the AI speaker of Company B shows the digital forensic results performed after injecting the certificate through the third and fifth methods. The electronic device 200 may verify information related to the Session token, User Info, Device Info, Memo Info, Alarm Info, Schedule Info, Location Info, Third-party app Info, Voice Command, and Usage Timestamp stored in the cloud server 250 by the AI speaker of Company B through communication with the cloud server 250.

The embodiments of the present invention disclosed in the present specification and drawings are only provided for specific examples to easily describe the technical content of the present invention and to aid understanding of the present invention, and are not intended to limit the scope of the present invention. Therefore, the scope of the present invention should be construed that all changes or modifications derived based on the technical idea of the present invention in addition to the embodiments disclosed herein are included in the scope of the present invention.

What is claimed is:

1. A method for performing digital forensics, comprising:
    performing, by an electronic device, an analysis of an Internet of Things (IoT) terminal by verifying type, operating system, support function, vulnerability and backdoor, printed circuit board (PCB) and chip-off availability of the IoT terminal to which digital forensics is to be performed;
    selecting, by the electronic device, an injection method of injecting a certificate into the IoT terminal, wherein the injection method is any one from among: a method of injecting an image of the IoT terminal into a portable device so that the portable device using the same operating system as the IoT terminal performs the same function as the IoT terminal, a method of emulating the IoT terminal in a pre-installed emulator, a method of connecting with the IoT terminal through an external port provided in the IoT terminal, and a method of injecting an chip which is off in the IoT terminal;
    injecting, by the electronic device, a certificate into at least one of the IoT terminal, the electronic device, and a portable device communicating with the IoT terminal using the selected injection method; and
    verifying, by the electronic device, data stored in a cloud server communicating with the IoT terminal based on the injected certificate.

2. The method for performing digital forensics of claim 1, further comprising, after injecting the certificate into the IoT terminal, setting, by the electronic device, a communication network and a proxy with the cloud server.

3. The method for performing digital forensics of claim 2, further comprising:
    after setting the communication network and the proxy;
    collecting, by the electronic device, network packets related to communication between the IoT terminal and the cloud server; and
    verifying, by the electronic device, access token information, types of personal information, and domain information of the cloud server included in the network packets by analyzing the network packets.

4. The method for performing digital forensics of claim 3, wherein the verifying the data stored in the cloud server communicating with the IoT terminal comprises performing, by the electronic device, a replay attack based on the access token.

5. An apparatus for digital forensics, comprising:
    a controller configured to:
        perform an analysis of an Internet of Things (IoT) terminal by verifying type, operating system, support function, vulnerability and backdoor, printed circuit board (PCB) and chip-off availability of the IoT terminal to which digital forensics is to be performed;
        select an injection method of injecting a certificate into an Internet of things (IoT) terminal through analysis of the IoT terminal, wherein the injection method is any one from among: a method of injecting an image of the IoT terminal into a portable device so that the portable device using the same operating system as the IoT terminal performs the same function as the IoT terminal, a method of emulating the IoT terminal in a pre-installed emulator, a method of connecting with the IoT terminal through an external port provided in the IoT terminal, and a method of injecting a chip which is off in the IoT terminal, and
        verify data stored in a cloud server communicating with the IoT terminal by injecting a certificate into at least one of the IoT terminal, the apparatus for digital forensics, and a portable device communicating with the IoT terminal using the selected injection method; and
    a display for displaying the verified data.

6. The apparatus for digital forensics of claim 5, wherein the controller sets a communication network and a proxy with the cloud server to collect network packets related to communication between the IoT terminal and the cloud server, and verifies access token information, types of personal information, and domain information of the cloud server included in the network packets by analyzing the network packets.

7. The apparatus for digital forensics of claim 6, wherein the controller performs a replay attack based on the access token.

* * * * *